E. B. ROLFE.
HORSE HITCHING DEVICE.
APPLICATION FILED JULY 1, 1909.

957,380.

Patented May 10, 1910.
2 SHEETS—SHEET 1.

WITNESSES:
M. A. Howe
E. E. Howe

INVENTOR
Eben B. Rolfe
BY
May. A. Schmidt
ATTORNEY

E. B. ROLFE.
HORSE HITCHING DEVICE.
APPLICATION FILED JULY 1, 1909.

957,380.

Patented May 10, 1910.
2 SHEETS—SHEET 2.

WITNESSES:
M. Q. Howe
E. C. Howe

INVENTOR
Eben B. Rolfe
BY
Max A. Schmidt
ATTORNEY

UNITED STATES PATENT OFFICE.

EBEN B. ROLFE, OF SPOKANE, WASHINGTON.

HORSE-HITCHING DEVICE.

957,380.  Specification of Letters Patent.  Patented May 10, 1910.

Application filed July 1, 1909. Serial No. 505,393.

*To all whom it may concern:*

Be it known that I, EBEN B. ROLFE, a citizen of the United States, residing at Spokane, in the county of Spokane and State of Washington, have invented certain new and useful Improvements in Horse-Hitching Devices, of which the following is a specification.

This invention relates to that class of horse-hitching devices which are actuated by the forward movement of the wheels of the vehicle, the bridle bit of the horse being connected to a member which is adapted to be inserted between the spokes of one of the wheels, so that if the horse attempts to move forward, a pull on the bridle bit is had.

It is the object of the present invention to provide a device of the class stated which is simple in structure, highly efficient and reliable in operation, and also one which is readily applicable to any ordinary vehicle.

With these objects in view, the invention consists in a novel construction and arrangement of parts to be hereinafter described and claimed, reference being had to the drawings hereto annexed, in which—

Figure 1:
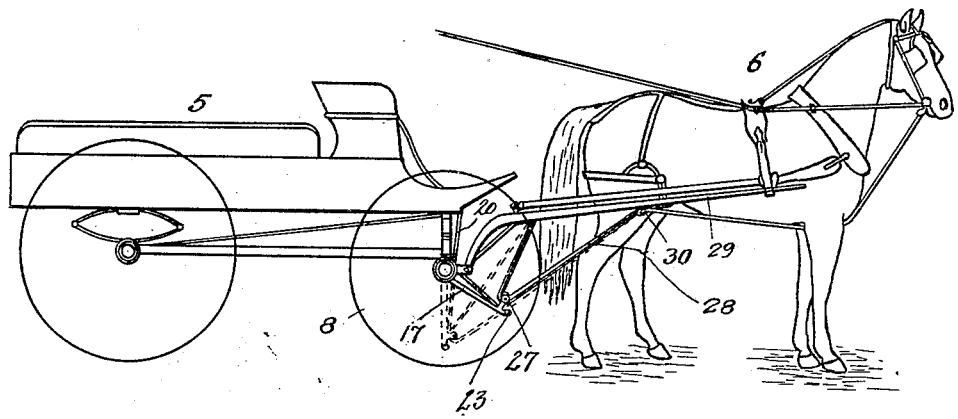
Figure 2:
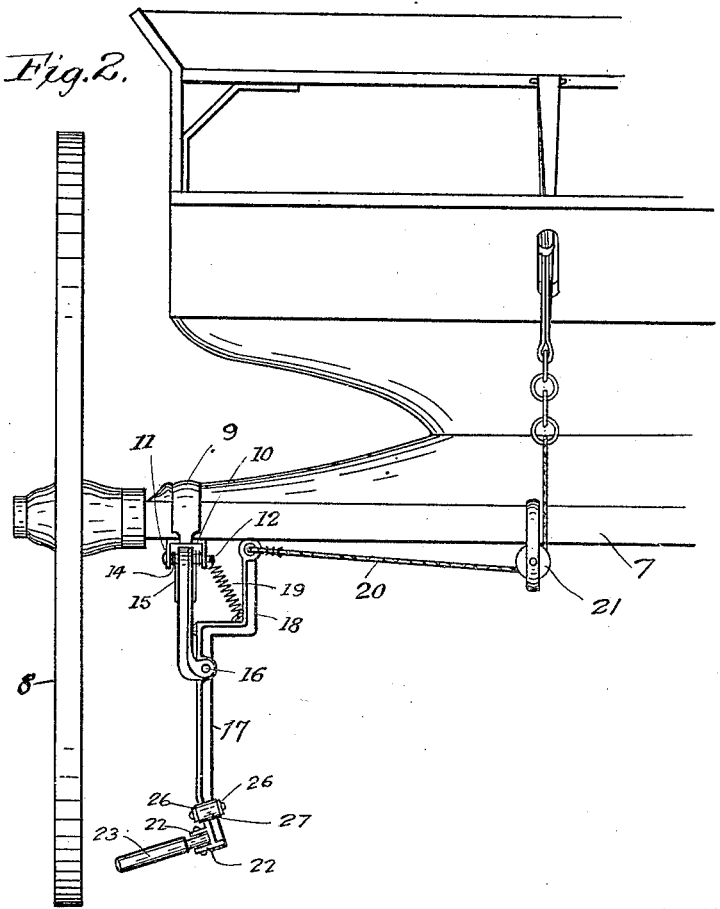
Figures 3, 4:
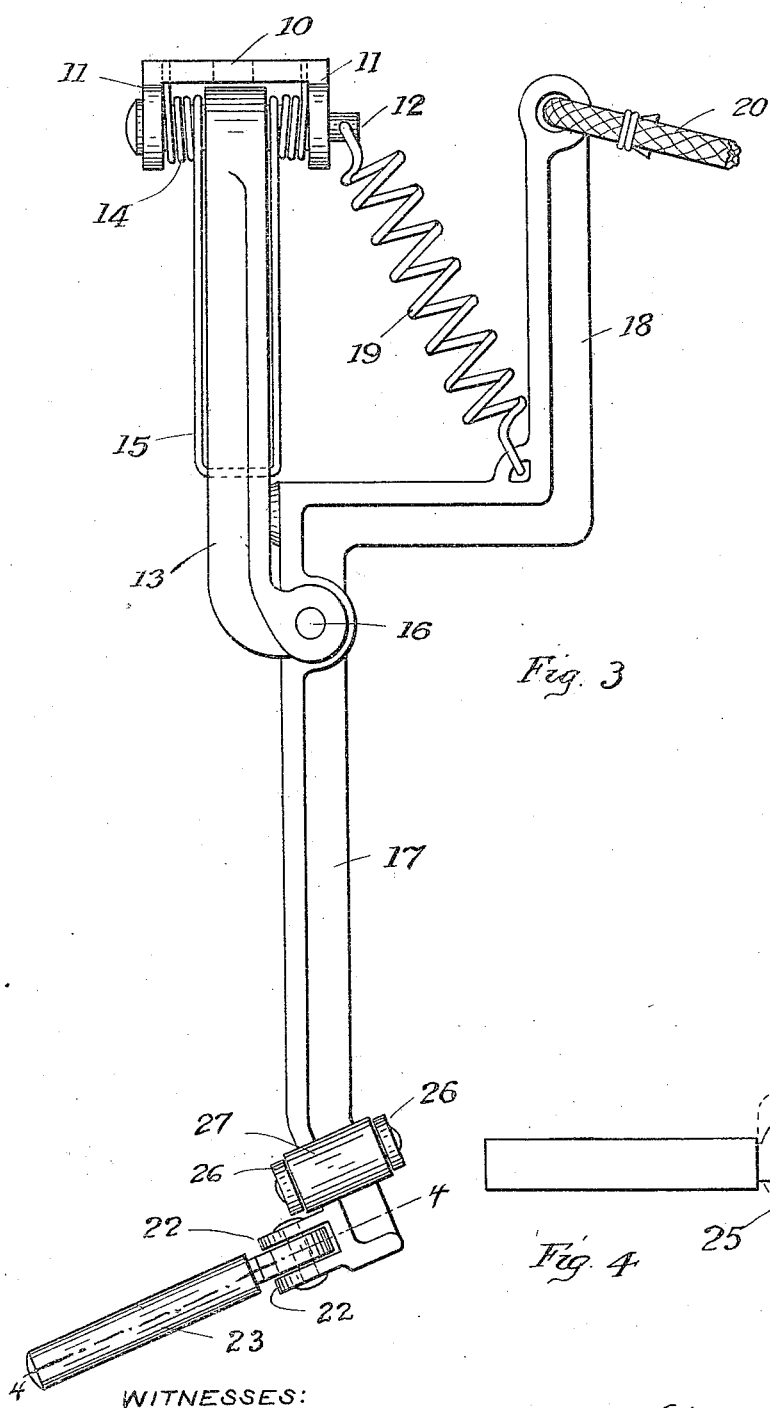

Figure 1 is a side elevation of a vehicle and the draft animal thereof, showing the application of the invention. Fig. 2 is a front elevation of the device showing its position on the vehicle. Fig. 3 is a front elevation of the device removed. Fig. 4 is a sectional detail on the line 4—4 of Fig. 3.

In the drawings, 5 denotes a vehicle, and 6 the draft animal thereof. To the front axle 7 of the vehicle, adjacent to one of the front wheels 8, is secured by means of a clip 9, or any other suitable fastening means, a plate 10 having outstanding ears 11. Mounted in said ears, and extending therebetween, is a pin 12, on which is mounted for swinging movement an arm 13. The pin is held against rotation in the ears by any suitable means. Around the pin is coiled a spring 14 having a looped portion 15 which projects outwardly into engagement with one side of the arm 13. There is sufficient space between the ears and the arm to permit the spring to be mounted on the pin as stated.
To the outer end of the arm 13 is pivoted at 16 a lever 17 having adjacent to the pivot a laterally extending portion terminating in an offset 18. At the junction of the laterally extending portion and the offset is an eye to which is connected one end of a coiled spring 19, the other end of which is connected to one end of the pin 12, said end projecting from one of the ears 11. To the outer end of the offset 18 is made fast a line 20 which extends along the front axle 7 to a pulley 21 mounted thereon, and from said pulley the line passes through an opening in the dashboard of the vehicle and extends to the seat to within easy reach of the driver.

The outer end of the lever 17 has ears 22 between which is pivoted a trip arm 23. That portion of the trip arm which works between the ears is reduced in thickness, and on its opposite edges are lugs 24 and 25, which are so located that they respectively engage opposite edges of the lever 17, whereby the swing of the trip arm is limited in both directions, the swing being in an arc of 90 degrees. The lever 17, near its outer end, is also formed with ears 26 between which is journaled on a pin carried by said ears, a roller 27. Around this roller passes a line 28, one end of which is secured in any suitable manner to one of the thills 29 of the vehicle. The other end of the line passes through a guide 30 on said thill, and thence extends between the front legs of the draft animal, and up to the bit, to which it is made fast in any suitable manner.

The parts herein described operate to pull upon the bit when the animal starts to move forward, in the following manner: The arm 13 is mounted to swing in a vertical plane, it being held normally in the elevated position shown in Fig. 1. The lever 17 is mounted to swing transversely of the vehicle toward and from the wheel 8. It is held normally swung away from said wheel by the spring 19. A pull on the line 20 swings the lever 17 in the direction of the wheel 8, and the trip arm 23 is thus inserted between the spokes thereof. If now the animal attempts to move forward, the first spoke forward of the trip arm will strike the same, whereby the lever 17 and the arm 13 are caused to swing downwardly and rearwardly as shown by dotted lines in Fig. 1. This swing will cause the line 28 to pull on the bit, and the animal is thus checked. If the animal should back the vehicle, the trip arm will yield to the rearward movement of the wheel, and become disengaged from the spokes. In Fig. 4 the full lines show the position of the trip arm when the wheel is turning forward. The trip arm swings on its pivot until the lug 24 strikes the edge of the lever 17, whereupon the downward swing of the lever, as described, takes place. When the vehicle backs, the trip arm swings away from the spokes as already described, to the position shown by dotted lines in Fig. 4, its swing in this direction being limited by the engagement of the lug 25 with the edge of the lever 17. Upon releasing the line 20, the spring 14 swings the parts forwardly and upwardly, and restores them to their normal position.

The device herein described is simple in structure, and can be readily applied to any ordinary vehicle, it is efficient in operation, and it effectually serves the purpose for which it is designed.

I claim:

1. The combination with a vehicle; of an arm mounted for vertical swinging movement on the vehicle, a lever pivoted intermediate its ends to the arm to swing transversely of the vehicle, a trip arm carried by one end of the lever, and adapted to enter between the spokes of one of the wheels of the vehicle, a line connected to the other end of the lever for swinging said lever in the direction of the wheel, and a line having a loose connection with that end of the lever carrying the trip arm.

2. The combination with a vehicle; of an arm mounted for vertical swinging movement on the vehicle, a lever pivoted intermediate its ends to the arm to swing transversely of the vehicle, a trip arm pivotally mounted on one end of the lever, and adapted to enter between the spokes of one of the wheels of the vehicle, said trip arm yielding in one direction, a line connected to the other end of the lever for swinging said lever in the direction of the wheel, and a line having a loose connection with that end of the lever carrying the trip arm.

In testimony whereof I affix my signature in presence of two witnesses.

EBEN B. ROLFE.

Witnesses:
H. E. SMITH,
NETTIE KING.